(12) United States Patent
Miklosi et al.

(10) Patent No.: US 6,425,621 B2
(45) Date of Patent: Jul. 30, 2002

(54) CONVERTIBLE MOTOR VEHICLE ROOF

(75) Inventors: Stefan Miklosi, München; Thomas Schütt, Fürstenfeldbruck, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/750,788

(22) Filed: Jan. 2, 2001

(30) Foreign Application Priority Data

Dec. 30, 1999 (DE) ......................................... 199 64 029

(51) Int. Cl.[7] ................................................. B60J 7/00
(52) U.S. Cl. ............. 296/108; 296/107.17; 296/107.08; 296/107.05
(58) Field of Search .............................. 296/108, 107.17, 296/107.08, 107.05, 107.01, 110, 121, 124

(56) References Cited

U.S. PATENT DOCUMENTS

| | | | | |
|---|---|---|---|---|
| 5,207,474 A | * | 5/1993 | Licher et al. | 296/108 |
| 5,746,470 A | * | 5/1998 | Seel et al. | 296/108 |
| 5,769,483 A | * | 6/1998 | Danzl et al. | 296/108 |
| 5,785,375 A | * | 7/1998 | Alexander et al. | 296/108 |
| 5,979,970 A | * | 11/1999 | Rothe et al. | 296/107.17 |
| 6,010,178 A | * | 1/2000 | Hahn et al. | 296/107.08 |
| 6,039,383 A | * | 3/2000 | Jambor et al. | 296/108 |
| 6,053,560 A | * | 4/2000 | Rothe | 296/108 |
| 6,062,625 A | * | 5/2000 | Elelnrieder et al. | 296/108 |
| 6,139,087 A | * | 10/2000 | Wolfmaier et al. | 296/107.05 |
| 6,239,605 B1 | * | 5/2001 | Miller | 324/763 |
| 6,299,234 B1 | * | 10/2001 | Seel et al. | 296/108 |
| 6,312,042 B1 | * | 11/2001 | Halbweiss et al. | 296/108 |
| 6,336,673 B1 | * | 1/2002 | Rothe et al. | 296/108 |
| 2001/0006297 A1 | * | 7/2001 | Dintner et al. | 296/108 |
| 2001/0024050 A1 | * | 9/2001 | Schutt et al. | 296/107.08 |
| 2001/0040385 A1 | * | 11/2001 | Obendiek | 296/108 |
| 2002/0003355 A1 | * | 1/2002 | Mac Farland | 296/108 |

FOREIGN PATENT DOCUMENTS

| | | |
|---|---|---|
| DE | 43 16 485 A1 | 11/1994 |
| DE | 44 35 222 | 11/1995 |
| DE | 196 39 504 A1 | 4/1998 |
| DE | 19714106 | * 10/1998 |
| DE | 198 05 477 C1 | 8/1999 |
| EP | 0 835 778 A1 | 4/1998 |

* cited by examiner

Primary Examiner—Ken Patel
(74) Attorney, Agent, or Firm—Nixon Peabody LLP; David S. Safran

(57) ABSTRACT

The invention relates to a convertible motor vehicle roof having a front roof section and a rear roof section, each roof section being pivotally mounted on the vehicle body by a lever mechanism. The rear roof section is mounted so as to pivot over the front roof section, and can be lowered jointly with the front roof section into a back stowage space or area in the motor vehicle. The rear roof section being supported with a pivoting capacity on at least one of the front roof section and the lever mechanism. Preferably, when the motor vehicle roof is in a closed position, at least one of the lever mechanism and the lever for the front roof section are located substantially vertical in an area of one side front edge of the front rear roof section.

14 Claims, 15 Drawing Sheets

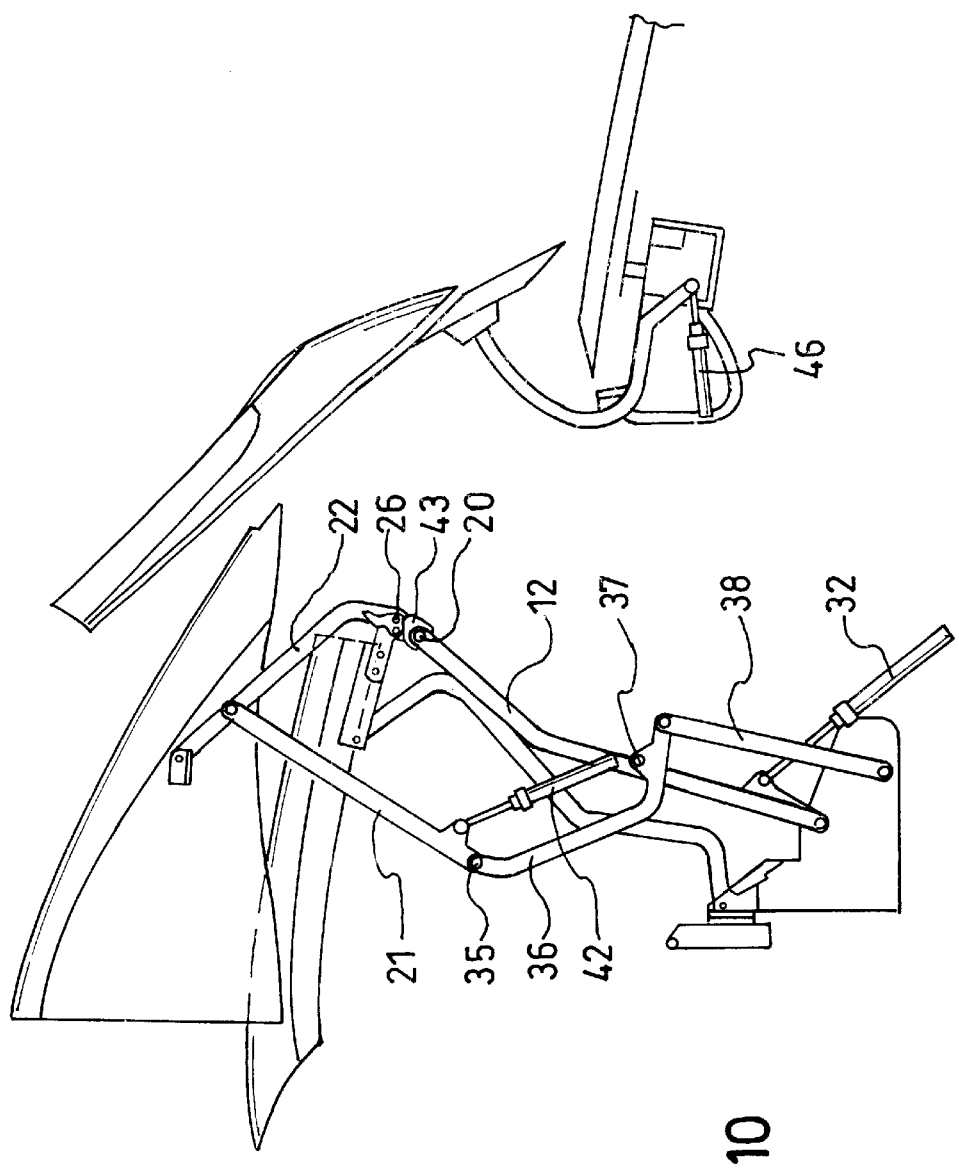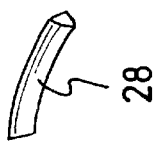
FIG. 10

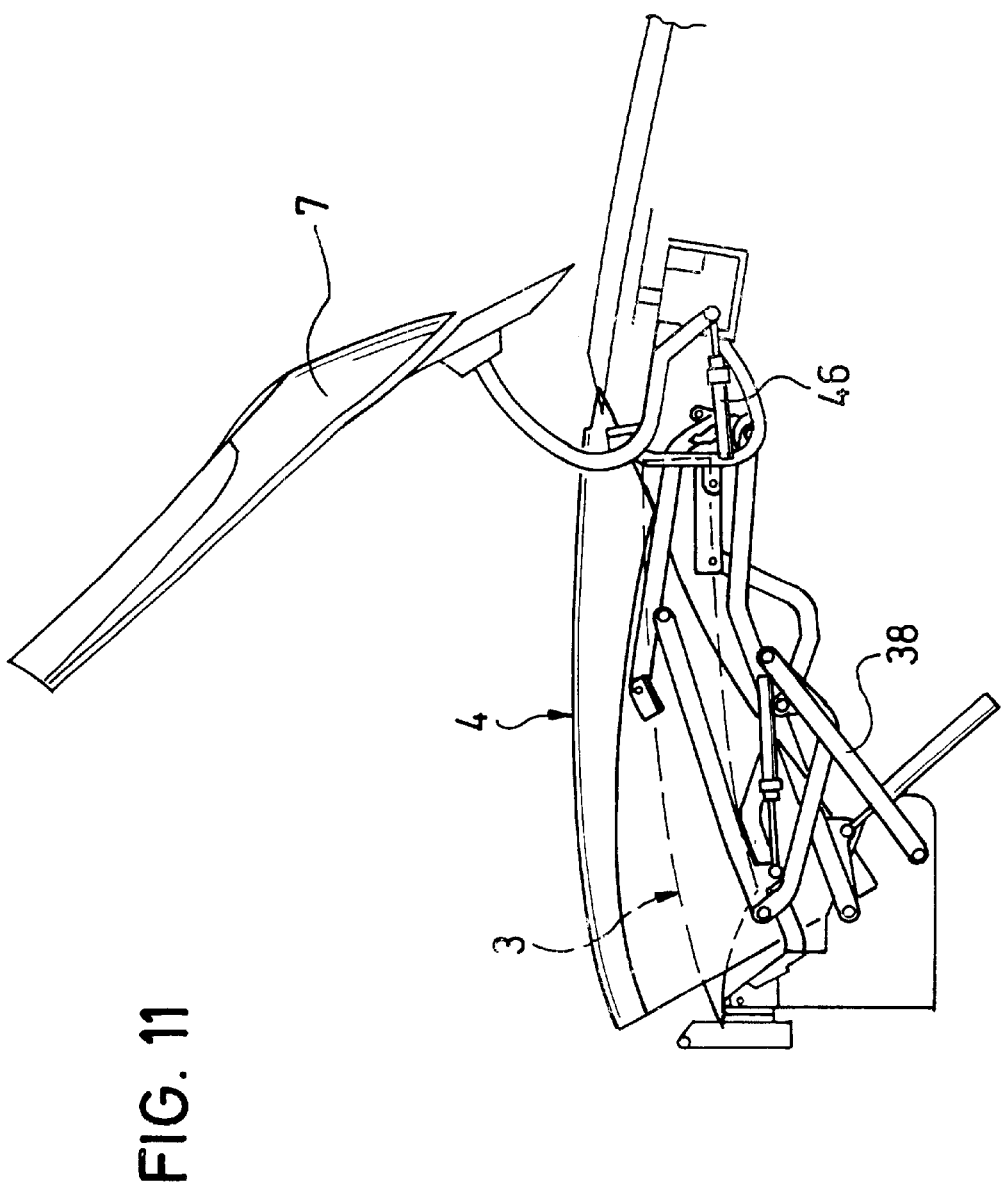
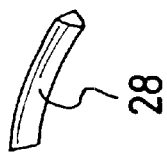
FIG. 11

FIG. 12
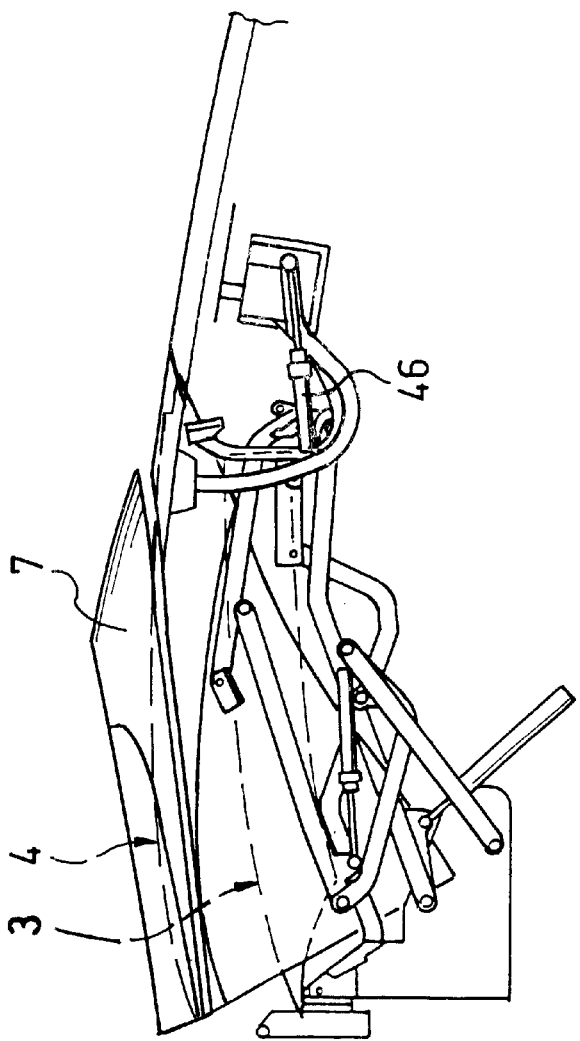
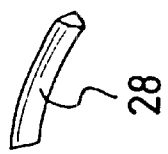

CONVERTIBLE MOTOR VEHICLE ROOF

BACKGROUND OF THE INVENTION

1. Field of the Invention

The invention relates generally to a convertible motor vehicle roof having a front roof section and a rear back section. More specifically, the invention relates to a convertible motor vehicle roof having a front roof section pivotally mounted using a lever device on the body of the motor vehicle and a rear section that can be pivoted via the front roof section and can be lowered jointly with the front roof section into a back stowage space in the motor vehicle.

2. Description of the Related Art

German Patent DE 44 35 222 C1 discloses a motor vehicle roof with a front roof section and a rear roof section. The front roof section, which can be locked on an apron via a roof rod coupled with a pivoting capacity, is coupled with a pivoting capacity to the body of the motor vehicle by means of a pivoting lever. The rear section which adjoins the front roof section to the rear and sits on a flap of the box for the folding roof to form a seal. The rear roof section forms a transition to the trunk and is movably supported via a pivoting lever which is supported on the vehicle body and which can be pivoted by means of a hydraulic cylinder. The hydraulic cylinder is coupled via another hydraulic cylinder to a rear coupling point of the rear roof section to the latter, and with an additional hydraulic cylinder and a telescoping guide which is parallel to it, which on the one hand are attached to the pivoting lever and on the other engage the rear section at the front coupling point, such that by pivoting and actuating the lever and hydraulic cylinder device the roof section can be raised from its closed position by the flap of the box for the folding top and can be pivoted forward to over the roof section. Then the rear section is locked on the roof section and after unlocking the roof rod and by actuating the lever and hydraulic cylinder device it is pivoted as a unit with the roof section to the rear into a stowage space and deposited there. In doing so the roof section swivels according to a guide by its pivoting rod and by the lever and hydraulic cylinder device of the rear section. This arrangement of the lever and hydraulic cylinder device however requires a lateral elongated recess for passage of the lever and hydraulic cylinder device in the flap of the box for the folding roof.

SUMMARY OF THE INVENTION

An object of the present invention is to provide a motor vehicle roof with a simplified and improved deposition mechanism. This object is achieved in accordance with the invention by providing a rear roof section being supported with a pivoting capacity on at least one of the roof section and the lever device. Such a configuration eliminates a direct lever connection between the rear roof section and the vehicle body so that when the rear roof section is pivoted up while opening the roof the cover of the box for folding the roof can be pivoted up unhindered by levers and rods. The levers and rods are used for supporting the rear roof section with a pivoting capacity in order to open the stowage space for the motor vehicle roof. The front roof section can also be divided into two or more sections which are coupled to one another and can be deposited jointly by the lever device.

Preferably, the lever device which supports the roof section contains two levers which form a four-bar mechanism. Depending upon the chosen position of the joints of the two levers, the pivoting motion of the roof section can be easily dictated and adjusted. Moreover, the rear roof section is also supported by a lever device which has two rods which form a four-bar mechanism. If one rod of the rear roof section is coupled to the roof section and the other rod is coupled to one of the two levers which support the roof section, by the relative motion of this lever a specific dynamic behavior of the rear roof section can be set when the motor vehicle roof is being lowered. But also, the two rods can also be coupled to the roof section and to at least one of the levers and one rod at the time can be coupled to one of the levers. At least one of the rods in these cases can contain a hydraulic cylinder device or it can be made as such in order to be able to change the length for the pivoting motion.

A configuration is especially preferred whereby when the motor vehicle roof is closed, the lever device or the levers of the roof section are located substantially vertically roughly in the area of one side front edge of the rear section. At the same time this front edge borders the door opening. By means of this arrangement unhindered viewing through the side window located in the rear section is not affected at all or is only slightly impaired. In addition, the pivoting path of the cover of the box for the folding roof with the hat rack is not adversely affected and lateral elongated recesses in the cover of the box for the folding roof are not necessary for the levers.

According to another preferred embodiment, the lever device for supporting the rear roof section has one rod which is supported on the roof section and another rod which is coupled by device of a supporting rod to one of the two levers which support the roof section. Compared to a four-bar mechanism, by means of the additional supporting lever, improved dynamic behavior can be achieved, especially when there is a drive device which couples the rod connected to the supporting rod and the lever which supports the roof section and upon actuation can change the distance between the rod and the lever for moving the rear section. Preferably, one of the levers which supports the roof section and one of the rods which supports the rear section are supported on the roof section, and, depending upon its pivoting position relative to the roof section, the lever fixes the pivoting position of the rod which supports the rear section relative to the roof section by a positioning device. One simply configured yet reliable positioning device contains a crank which is located on the lever and an actuating section which is connected to the rod and which engages the crank at least over a certain pivoting range. Preferably, the stowage space for the motor vehicle roof is a box for the folding roof which can have side boundaries and a bottom. When the bottom of the box for the folding roof can be removed behind the seats when the motor vehicle roof is closed, a cargo space or the trunk space can be enlarged.

In one preferred configuration, the two lever device are designed such that when the motor vehicle roof is lowered, first the rear section is pivoted over the roof section, then the cover of the stowage space or of the box for the folding roof is pivoted up, the roof section with the rear section is deposited into an substantially horizontal arrangement in the stowage space or the box for the folding roof and the cover of the stowage space or the box for the folding roof is pivoted down again. Preferably, the roof section and the rear section each contain its own drive, but there can also be a common drive for the roof section and the rear section.

BRIEF DESCRIPTION OF THE DRAWINGS

FIG. 10 shows in a side view the motor vehicle roof in a second intermediate open position;

FIG. 11 shows in a side view the motor vehicle roof deposited in the box for the folding roof;

FIG. 12 shows in a side view the motor vehicle roof deposited in the box for the folding roof with the cover of the box for the folding roof closed;

BRIEF DESCRIPTION OF THE PREFERRED EMBODIMENTS

Figure 1:
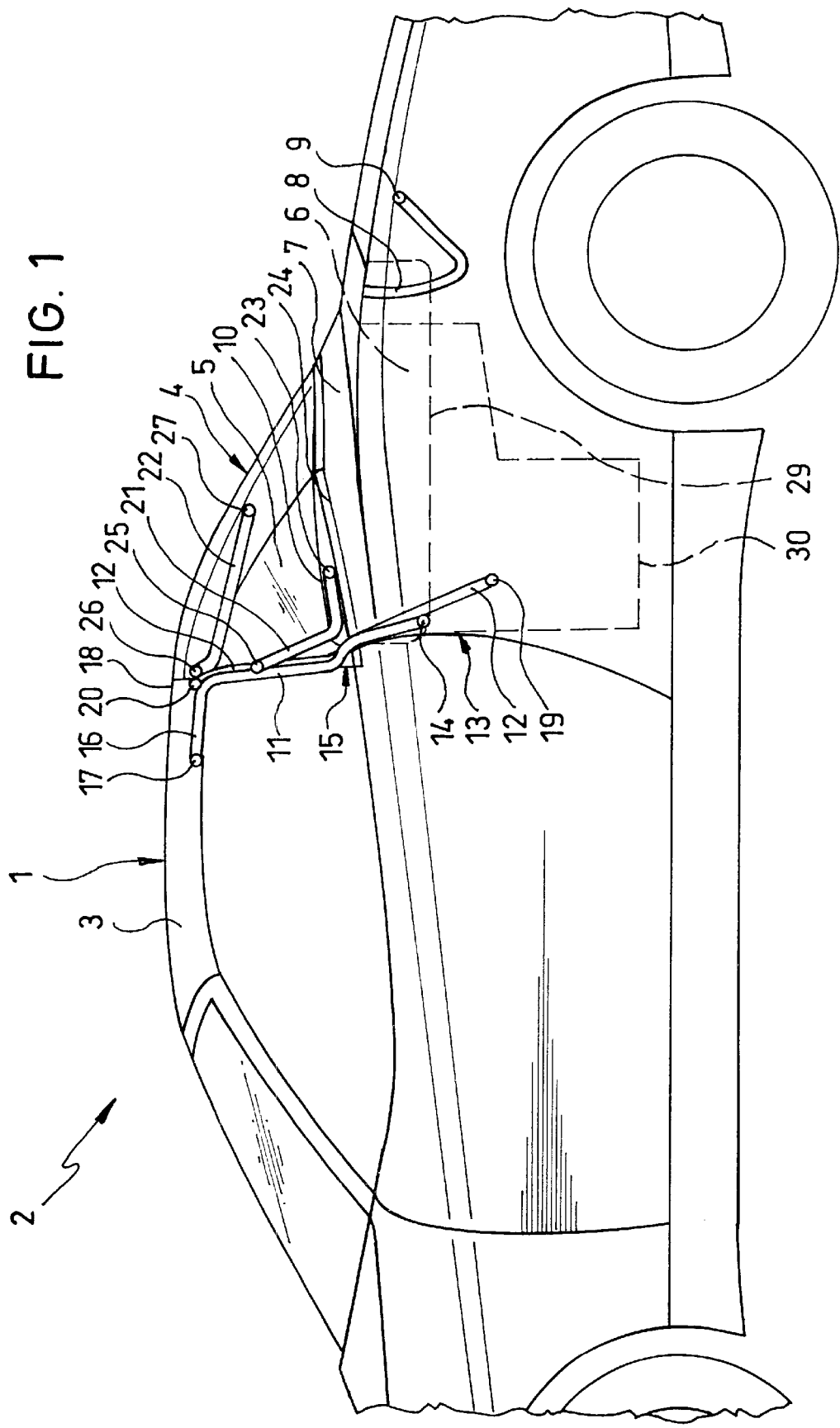
FIG. 1 shows in a side view a first embodiment of a hardtop motor vehicle roof of a convertible in the closed position.

And now to the drawings, in which FIG. 1 shows a motor vehicle roof 1 of a convertible motor vehicle 2 having a convertible hardtop including a front solid front roof section 3 and a rear solid roof section 4 which contains one back side window 5. The motor vehicle roof 1 can be converted for opening by a front roof section 3 with the rear roof section 4 being deposited in a stowage space 6 such as a box for the folding roof, behind the vehicle seats. The stowage space 6 of the folding roof includes a cover 7 supported by a rod 8 with a rear joint 9 on the body of the vehicle 2. The cover 7 may contain a hat rack 10 and also can be pivoted in an upward position relative to its resting position (the description of the motor vehicle roof is made on the basis of bearing device which are on the left side relative to the vehicle and which face the viewer, of course also the opposite right motor vehicle side having the corresponding bearing means). With the motor vehicle roof 1 closed, the rear roof section 4 sits tightly on the cover 7.

The front roof section 3 is pivotally-supported on the vehicle 2 by a lever device having two levers 11, 12 which form a four-bar mechanism. The first lever 11 is supported on a lower joint 14 inside an area of a rear door frame 13 of the vehicle 2 body. When the vehicle roof 1 is placed in the closed position, the first lever 11 is aligned substantially vertically along one side front edge 15 of the rear roof section 4, the first lever 11 being located on the inside of the rear roof section 4 behind a door seal which is attached to the side front edge 15 of the rear roof section 4 for a side door window. A top end section 16 of the first lever 11 is angled forward on the upper door seal on the side edge of the front roof section 3 and extends as far as a joint 17 which is spaced away from the rear edge 18 of the front roof section 3. The second lever 12 of the lever device is supported on a lower joint 19 located laterally on the vehicle body 2 underneath the lower joint 14 of the first lever 11. The second lever 12 extends substantially proximate to the first lever 11 upward as far as a joint 20 in the area of the rear edge 18 of the front roof section 3. The positions of the joints 14, 17, 19, 20 of the levers 11, 12 are chosen according to the dynamic behavior which can be achieved by a four-bar mechanism.

The rear roof section 4 is pivotally-supported via a lever device having two rods 21, 22 which are supported in the four-bar mechanism, the first rod 21 is bent angularly and extends forward from a joint 23 on the side lower edge 24 of the rear roof section 4. The front rod 21 extends upwardly on the front edge 15 up as far as a joint 25 which is located on the second lever 12 of the front roof section 3. The second rod 22 is laterally supported on a joint 26 on the rear edge 18 of the front roof section 3 and also on a joint 27 on the lateral roof area of the rear roof section 4.

Figure 2:
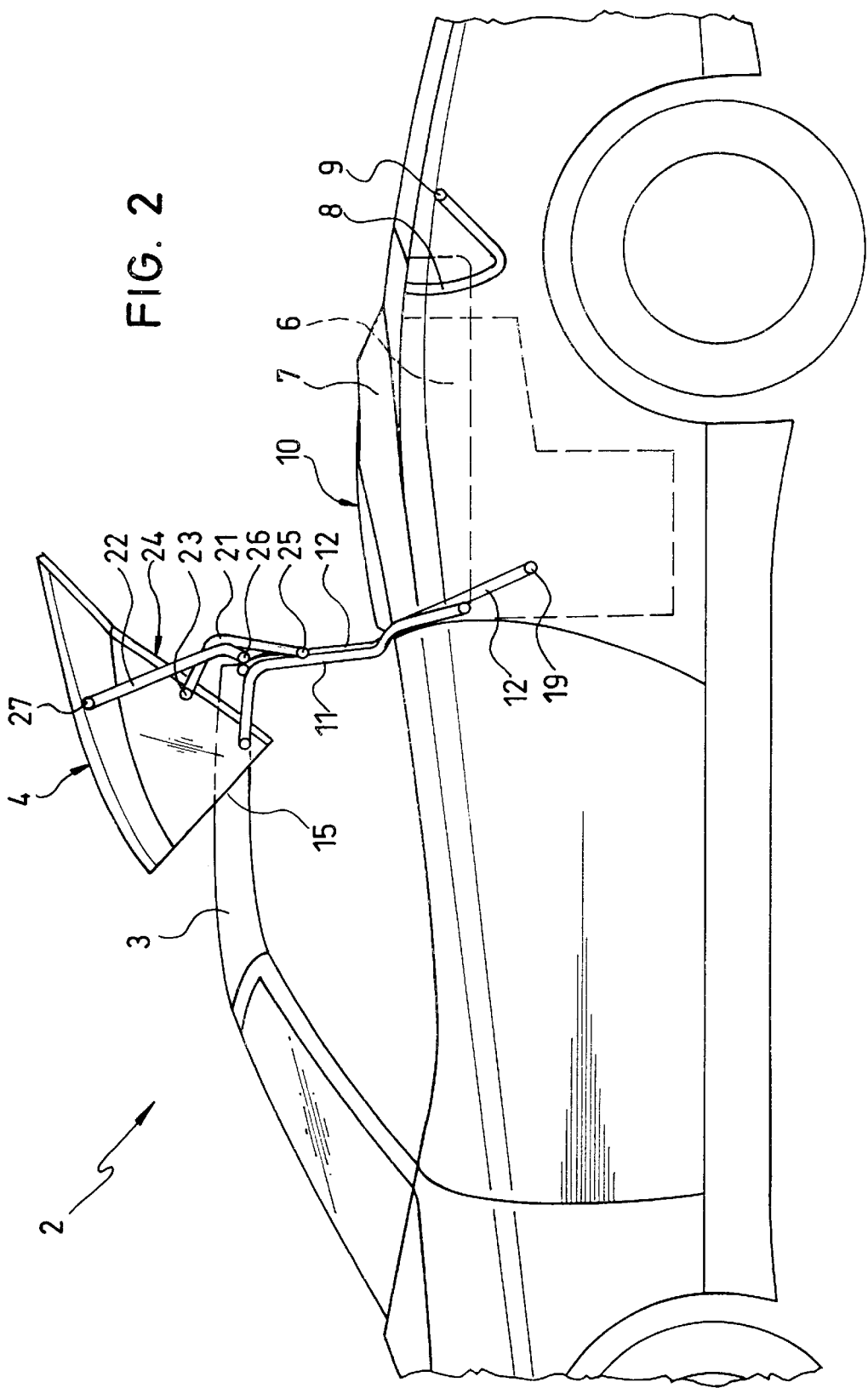
FIG. 2 shows in a side view the motor vehicle roof in a first intermediate open position.
Figure 3:
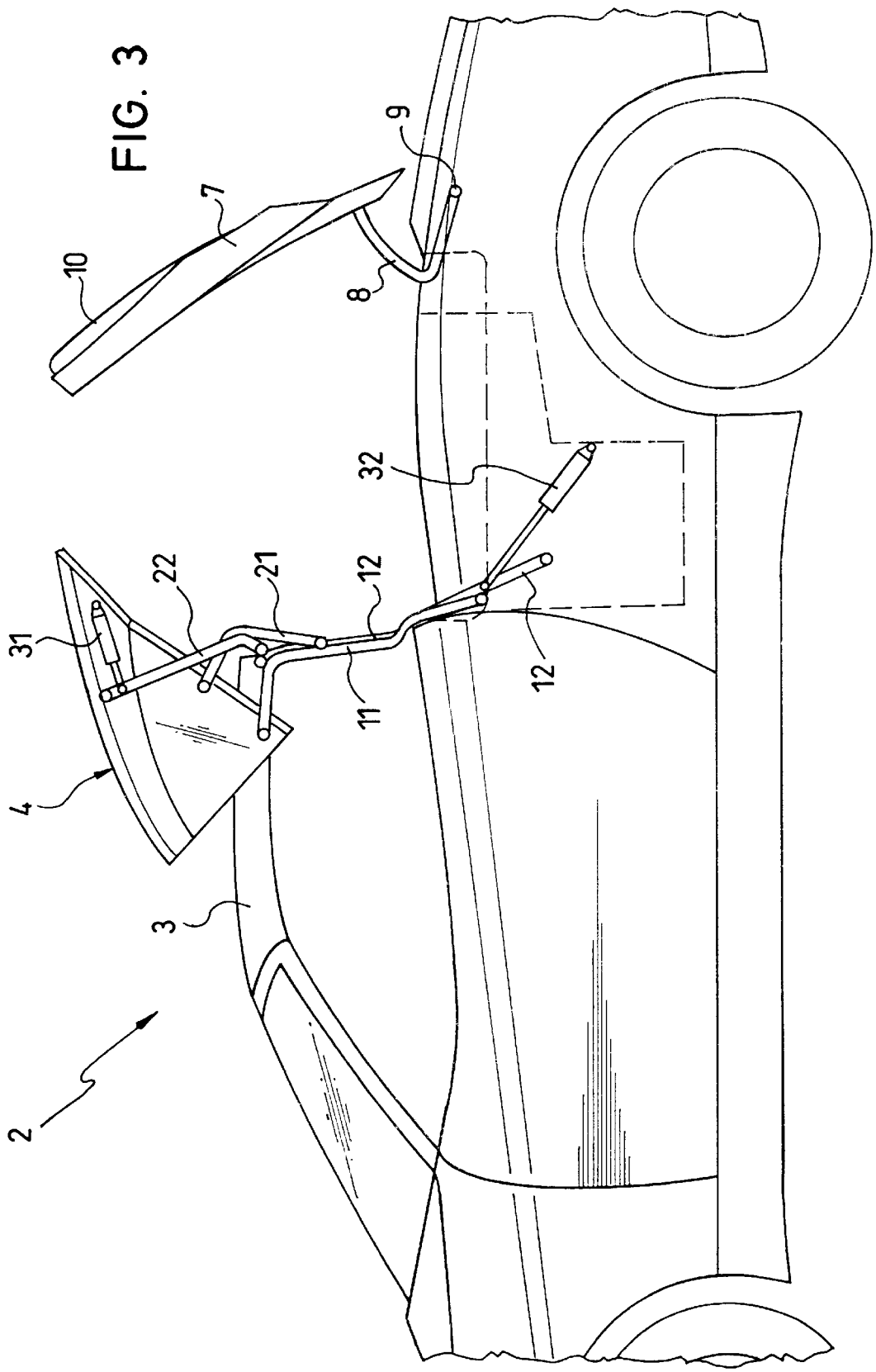
FIG. 3 shows in a side view the motor vehicle roof in a first intermediate open position with the cover of the box for the folding roof opened.

As shown in FIGS. 2 and 3, to open the vehicle roof 1, the rear roof section 4 is pivoted by a drive device 31 from its closed position on the cover 7 of the stowage space 6 into an intermediate position upward and forward over the front roof section 3. The drive device 31 is a hydraulically actuated piston-cylinder unit located hidden on the rear roof section 4, and is connected on one end to the second rod 22 which supports the rear roof section 4 and on the opposite end to the rear roof section 4. After the rear roof section 4 has assumed the open position as shown in FIG. 2, the pivoting path for the cover 7 is uninhibited, and the cover 7 is folded up by means of the rod 8 around the joint 9, and thus, clears the stowage space 6. A second drive device 32 including a hydraulically actuated piston-cylinder unit being coupled at one end to the lever 12 which supports the front roof section 3 and on an opposite end is supported on the body. Through the second drive device 32, the front roof section 3, upon being released on its front edge from the lock engagement on an airscoop 28, is pivoted and lowered via levers 11, 12 to the rear in the direction of the stowage space 6.

Figure 4:
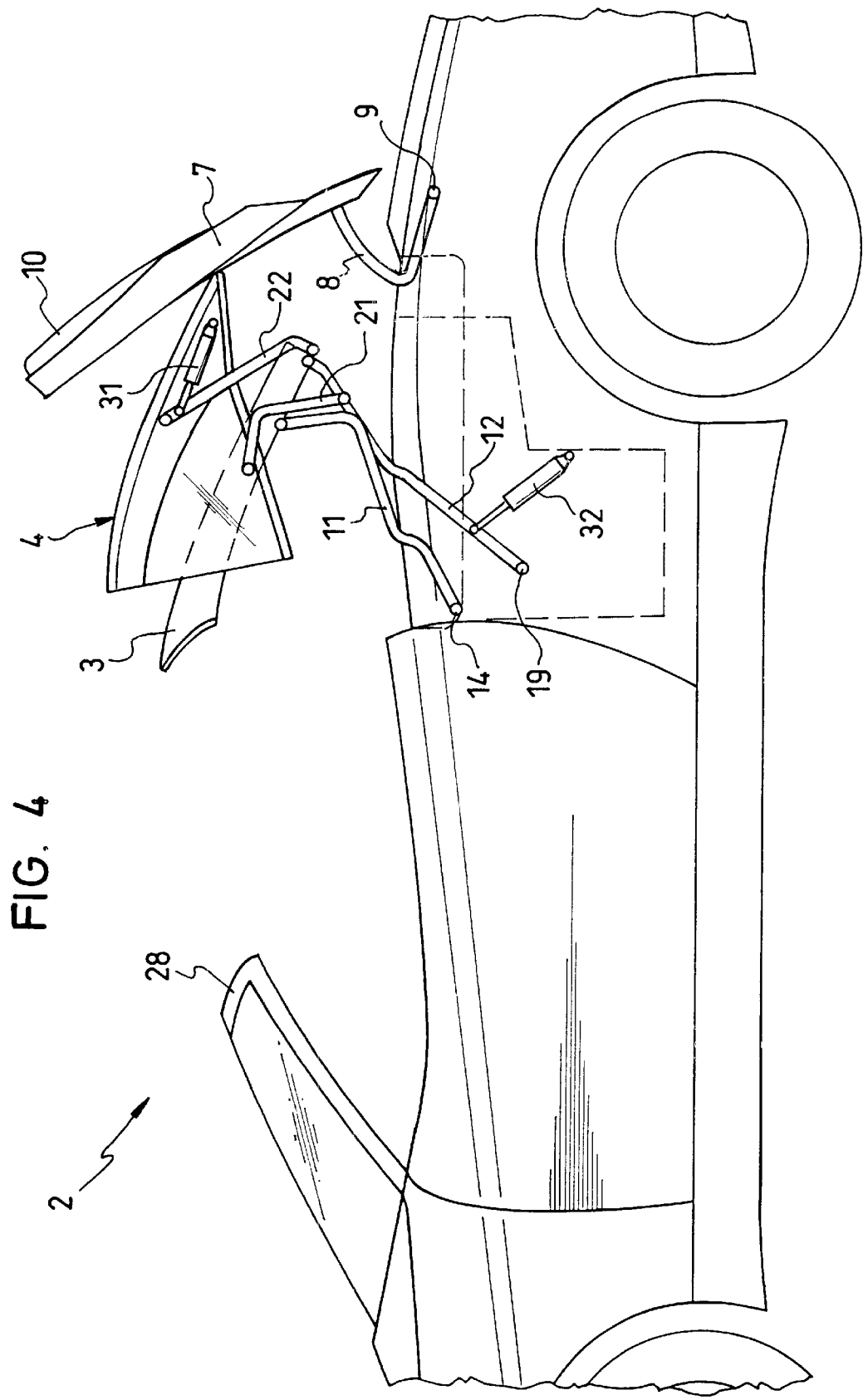
FIG. 4 shows in a side view the motor vehicle roof in a second intermediate open position.
Figure 5:
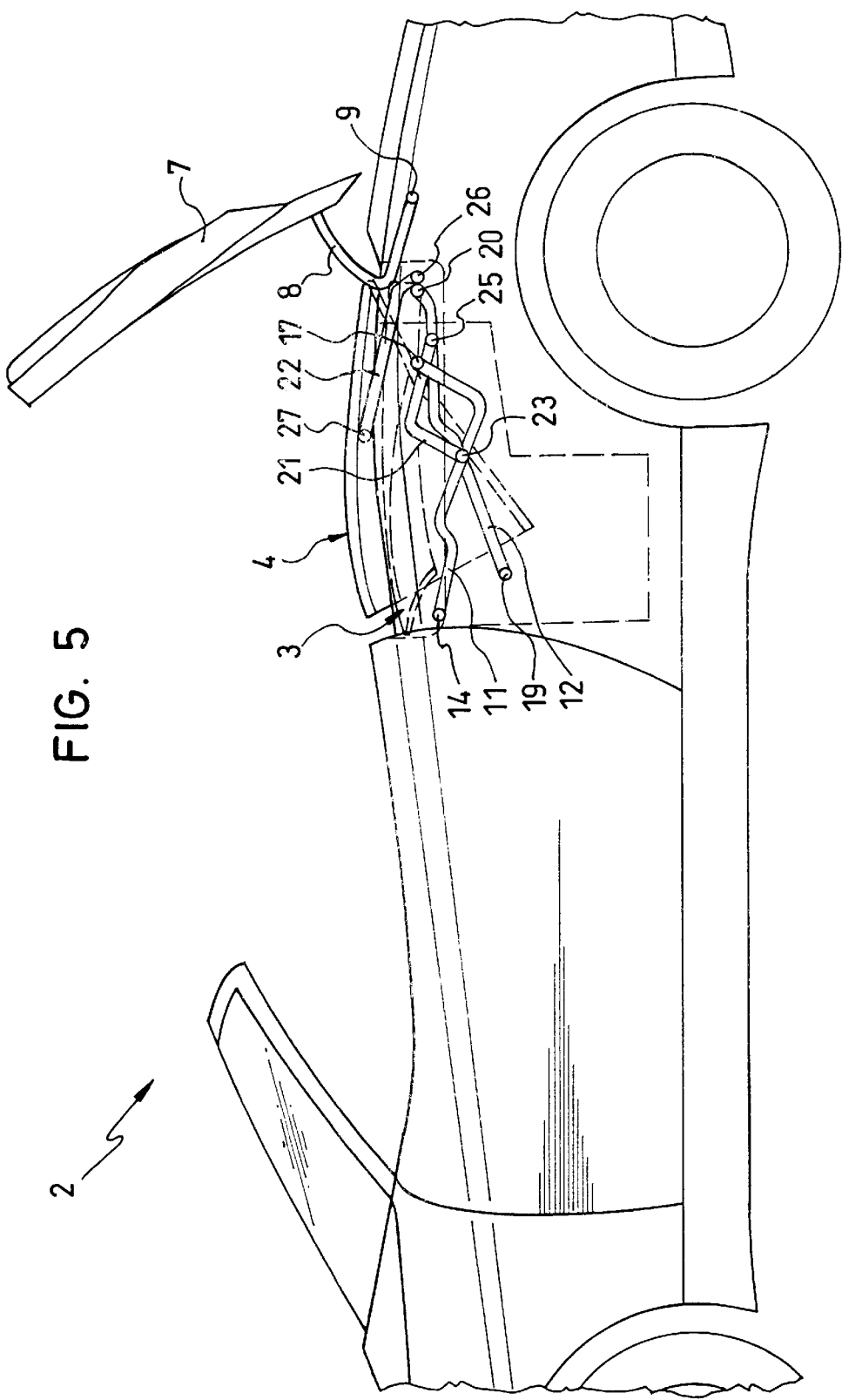
FIG. 5 shows in a side view in a schematic representation the motor vehicle roof deposited in the box for the folding roof.
Figure 6:
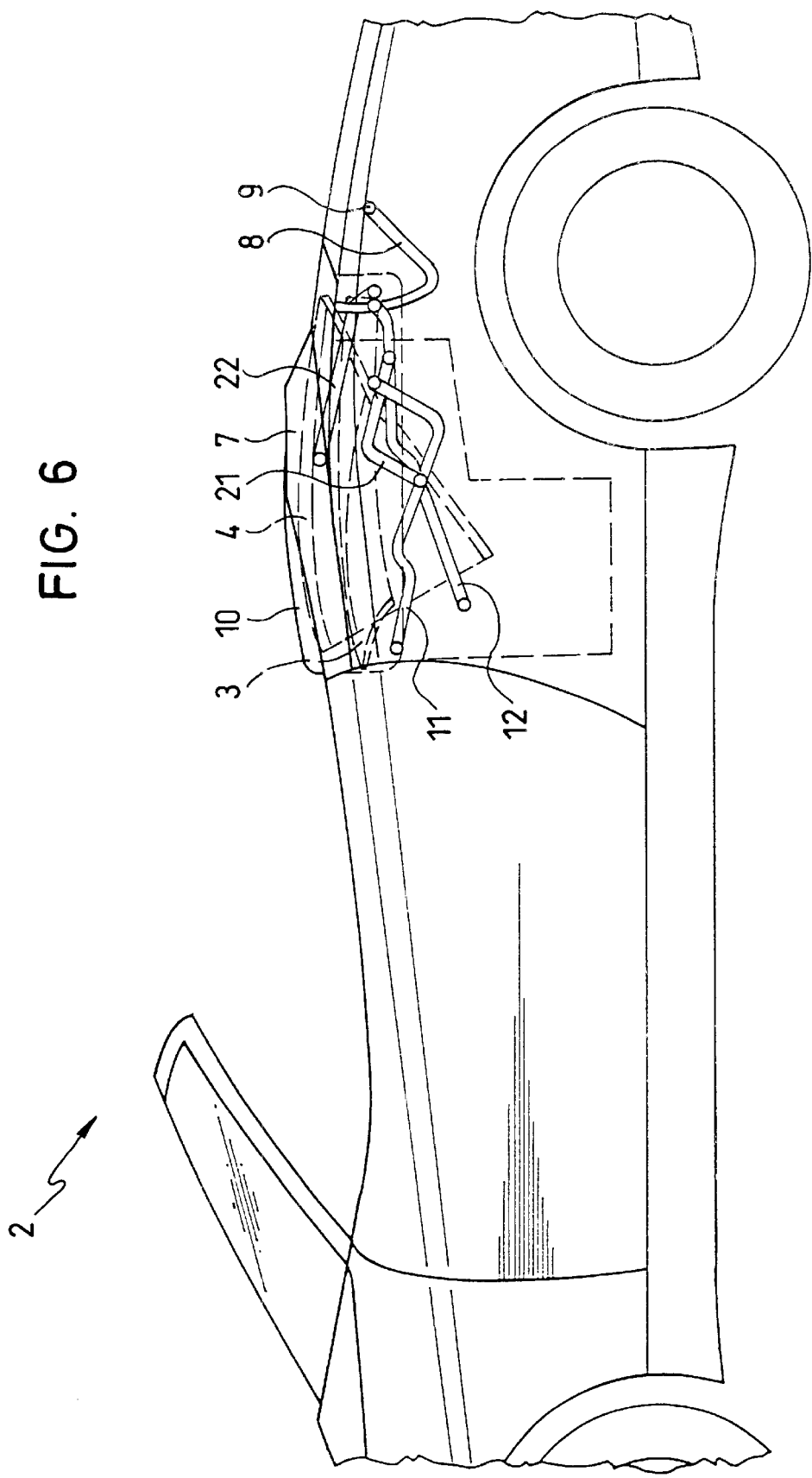
FIG. 6 shows in a side view the motor vehicle roof deposited in the box for the folding roof with the cover of the box for the folding roof closed.
Figure 7:
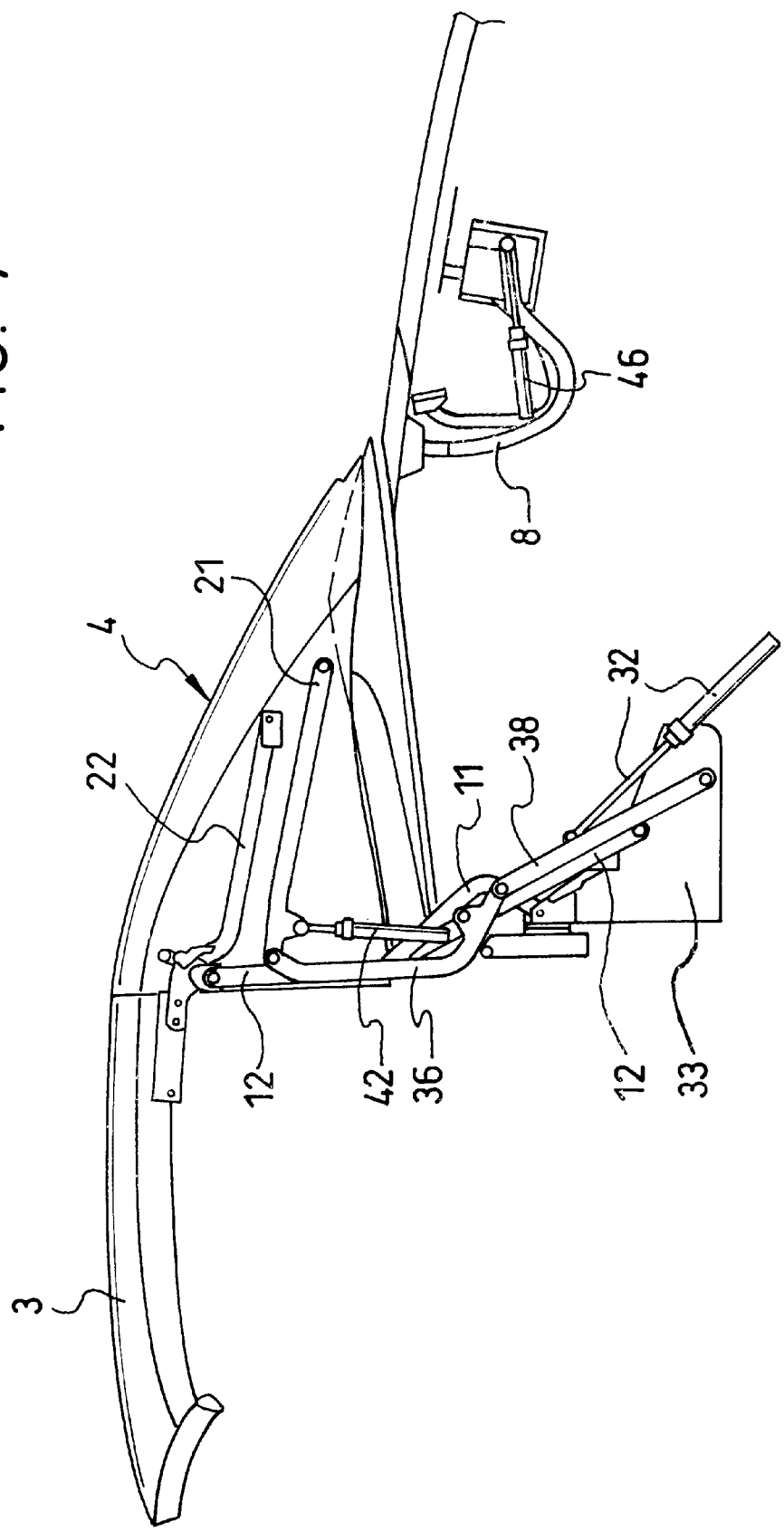
FIG. 7 shows in a side view a second embodiment of the hardtop motor vehicle roof in the closed position.
Figure 8:
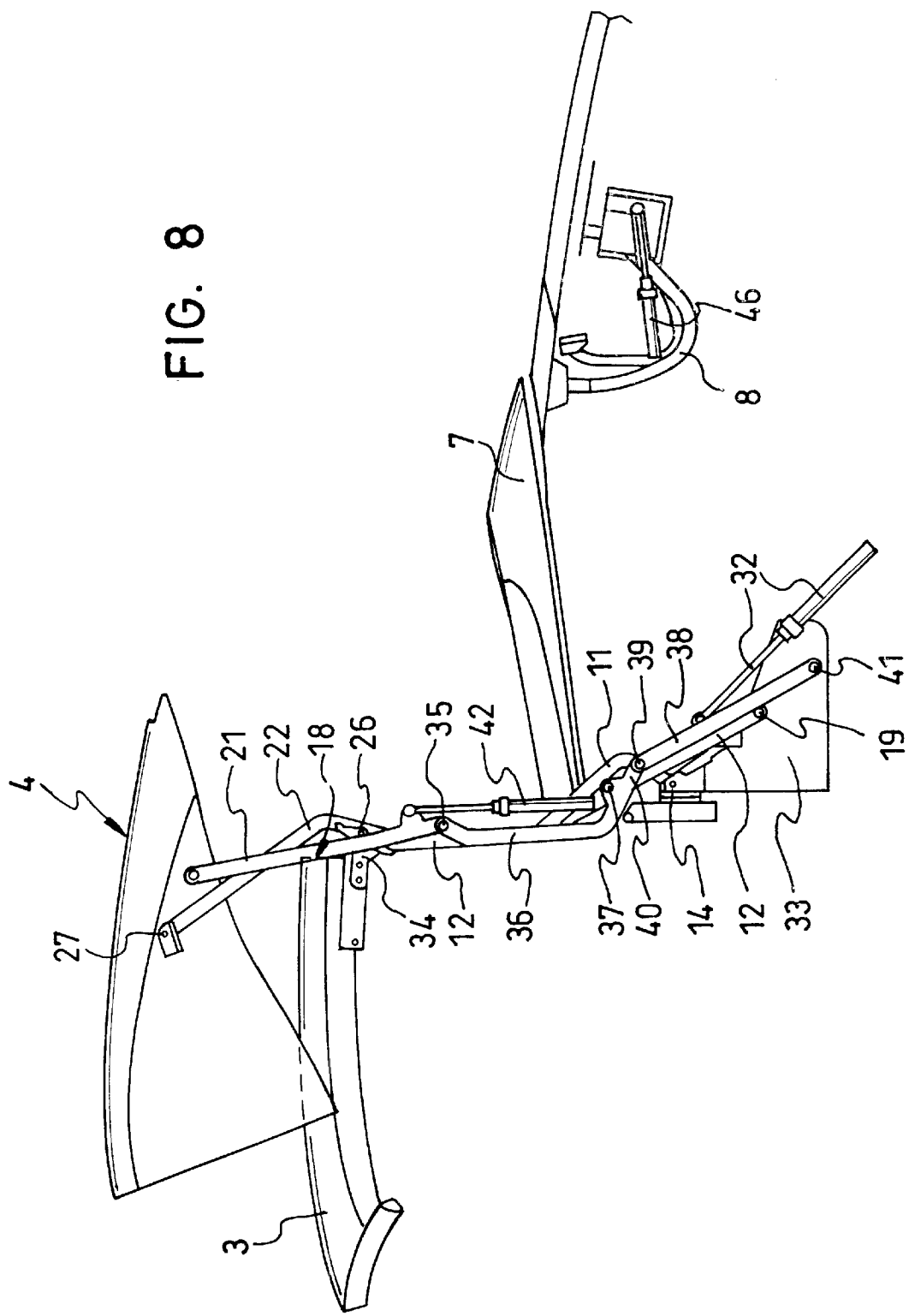
FIG. 8 shows in a side view the motor vehicle roof as shown in FIG. 7 in a first intermediate open position.

As shown in FIGS. 4 and 5, synchronously with the motion of the front roof section 3, the rear roof section 4 is entrained and lowered towards the front roof section 3 as a result of the lever and rod kinematics. As shown in FIG. 5, in the end swivel position, the roof 1 is deposited in the stowage space 6 in a substantially horizontal position. The rear roof section 4 is deposited via its rods 21 and 22 in a space-saving arrangement closely adjacent on the roof section 3. Finally, the cover 7 is folded back on the stowage space 6 for the folding roof again into its covered position in which it covers the front roof section 3 and the rear roof section 4 partially or completely (FIG. 6). Thus the vehicle roof 1 of the convertible 2 is in its open position. Closing the vehicle roof 1 takes place in the opposite sequence of motions. The bottom 29 of the stowage space 6 can be made removable so that with the vehicle roof 1 closed a cargo space 30 located underneath the box 6 for the folding roof (shown in FIG. 1 by the broken line) is accessible via the stowage space 6.

FIGS. 7–15 illustrate a second embodiment of the vehicle roof 1 including a modified bearing device for the rear roof section 4. The front roof section 3 is movably supported according to the first embodiment via the levers 11, 12 on a body-mounted main bearing 33 by means of joints 14, 19 and can be pivoted by the drive device 32. The rear roof section 4 is movably supported via the rods 21, 22 of the four-bar mechanism. Here, one end of the second rod 22 is laterally supported according with the first embodiment by a joint 26 on a carrier part 34 attached to the rear edge 18 of the front roof section 3, and on a opposite end by the joint 27 on the side roof area of the rear roof section 4. The first rod 21 is pivotally-connected to a supporting rod 36 which supports the front roof section 3 by a joint 35, the supporting rod 36 being pivotally-mounted on the lever 12 by a joint 37. Furthermore, a control rod 38 is coupled at one end by a joint 39 to an end section 40 of the supporting rod 36 projecting over the joint 37, and at an opposite end to a body-mounted coupling 41 located on the main bearing 33. The drive device 42, preferably a hydraulic piston-cylinder unit, joins the lever 12 to the first rod 21 (see FIG. 10).

Figure 9:
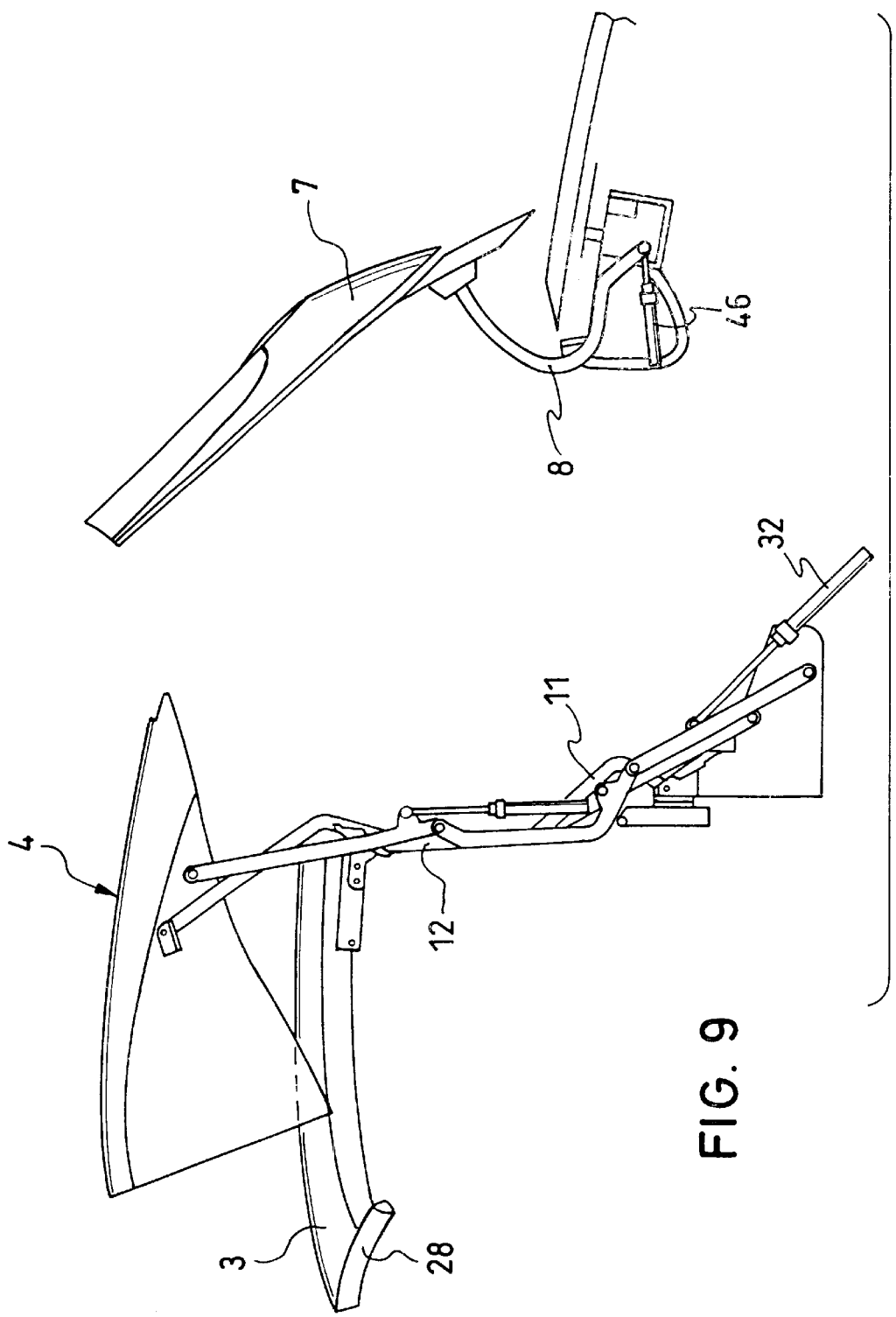
FIG. 9 shows in a side view the motor vehicle roof in a first intermediate open position with the cover of the box for the folding roof opened.
Figure 13:
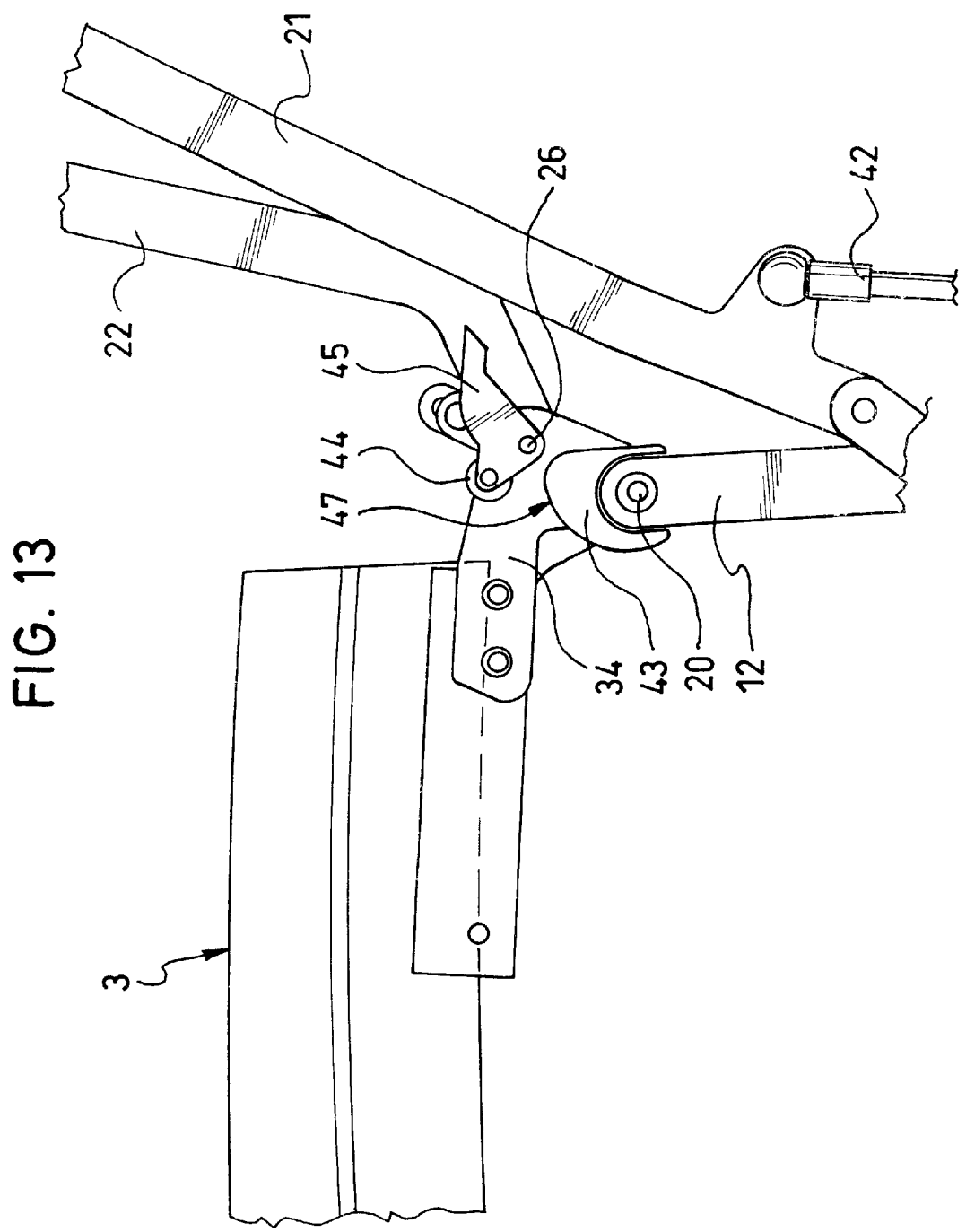
FIG. 13 shows in an enlarged representation the lever mechanism which supports the front roof section.

As shown in FIG. 10 and FIG. 13, the lever 12 is supported at one end by the joint 20 including a crank 43 on which a roller 44 rolls, the roller 44 being supported on a bearing part 45 which is permanently connected to the rod 22. To open the vehicle roof 1, first the rear roof section 4 is pivoted by the drive device 42 out of its closed position on the cover 7 into an intermediate position up and forward over the front roof section 3 (FIG. 8), the hydraulic piston-cylinder unit of the drive device 42 being pressurized and the piston rod emerging from the cylinder. After the rear roof section 4 has assumed the position shown in FIG. 8, the cover 7 is folded upward by the rod 8, the rod 8 preferably being driven by the drive device 48 and thus clears the stowage space 6 or the box for the folding roof to the top (FIG. 9). By the hydraulic piston-cylinder unit of the drive device 32, the front roof section 3, upon its release on its front edge from locking engagement on the airscoop 28, is pivoted and lowered via the levers 11, 12 to the rear in the direction of the stowage space 6 (FIG. 10), and at the same time the hydraulic piston-cylinder unit of the drive device 42 is cleared such that the piston can be pushed into the cylinder by the lever 12 and the rod 21 which approach one another as they move. The positioning of the rear roof section 4 on the front roof section 3 is supported by a positioning device which is formed by the crank 43 and the roller 44 which rolls on a crank path 47 of the crank 43 (see FIGS. 13–15) by the swivel position of the lever 12 changing relative to the carrier part 34 and thus the joint 26 when the two levers 11 and 12 are pivoted backwards.

Figure 14:
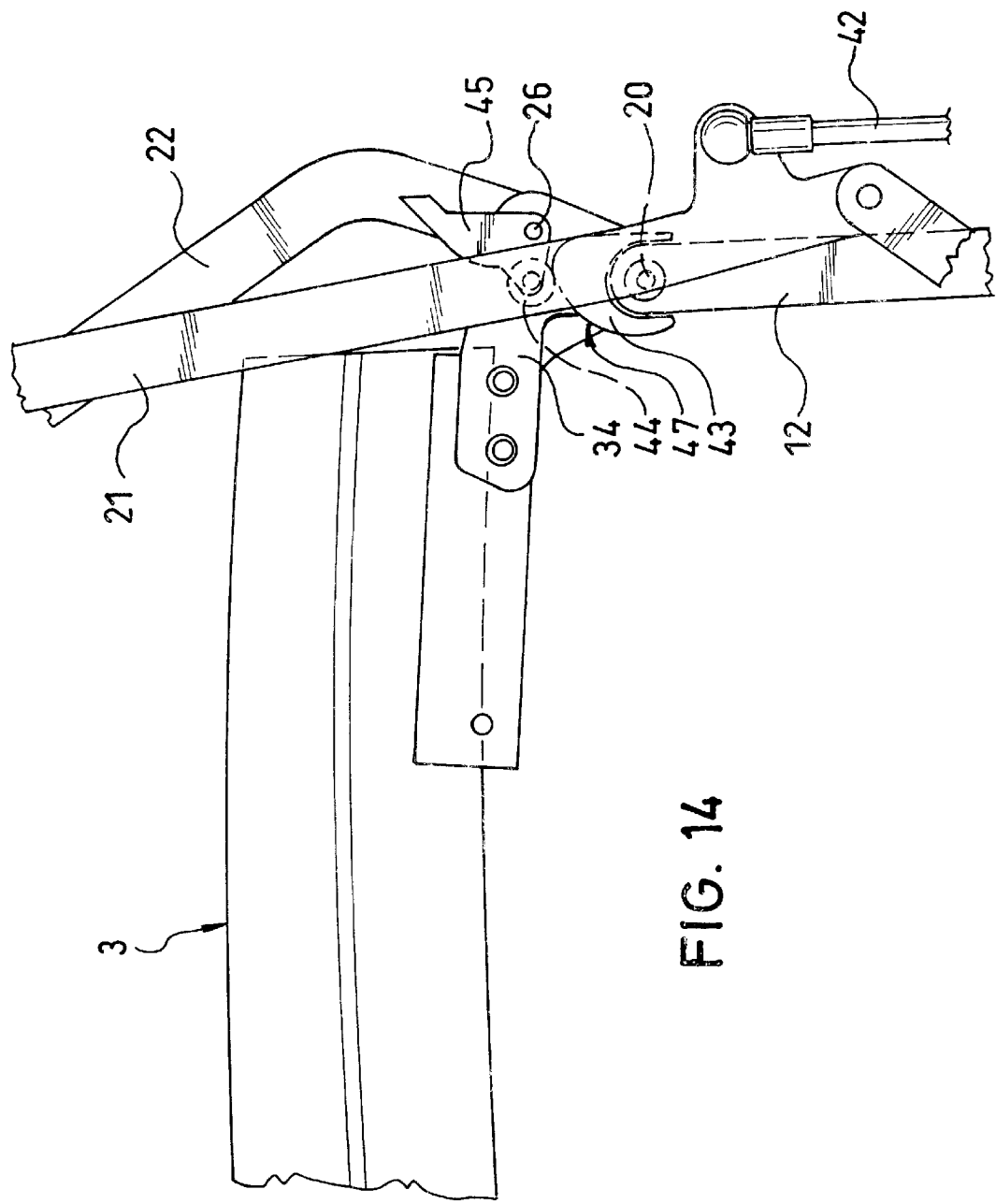
FIG. 14 shows in an enlarged representation the lever mechanism which supports the front roof section in the position as shown in FIG. 8.
Figure 15:
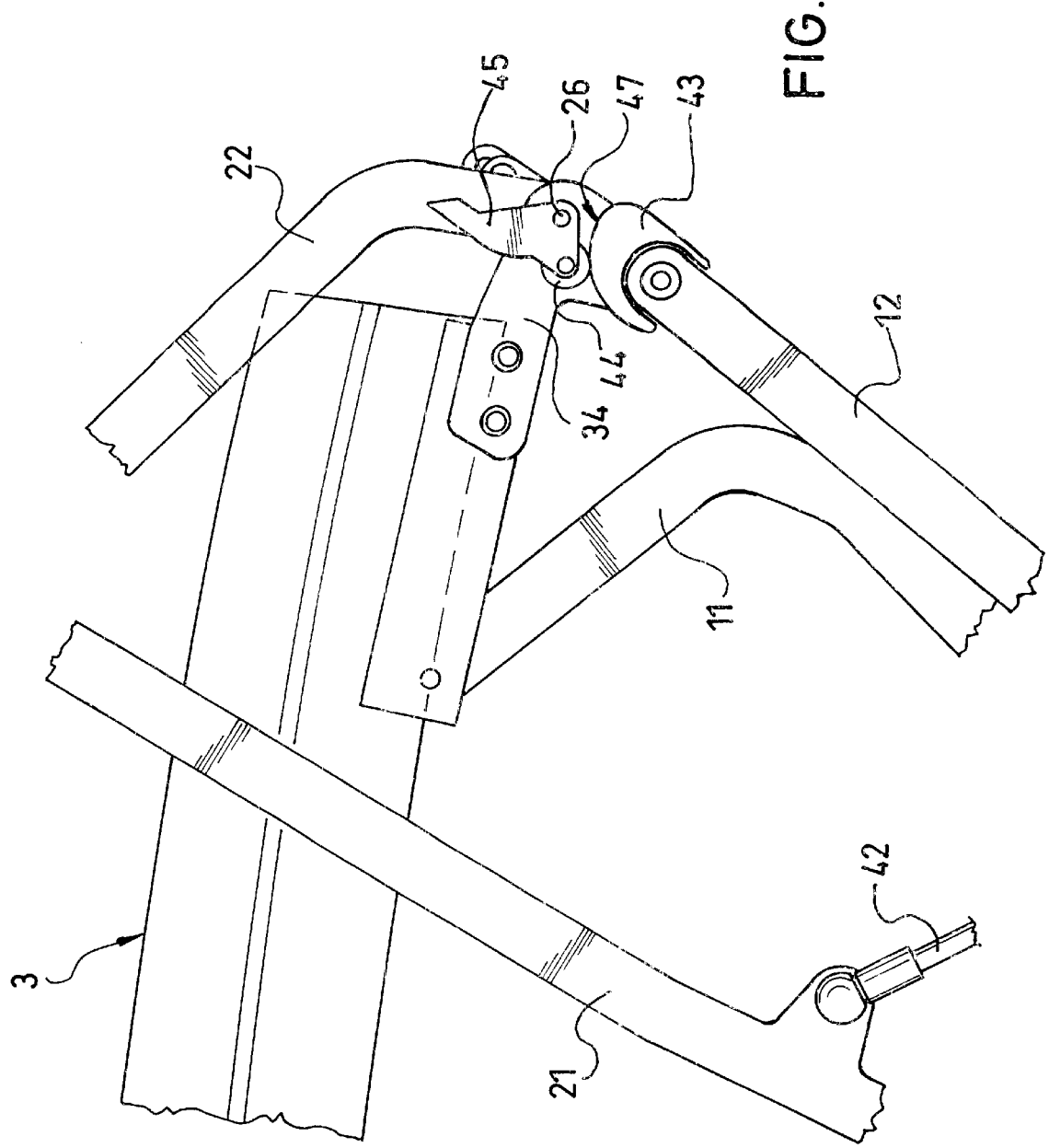
FIG. 15 shows in an enlarged representation the lever mechanism which supports the front roof section in the position as shown in FIG. 10.

As shown in FIG. 14, the respective distance between the crank path 47 and the joint 26 changes during this motion so that the roller 44 which is guided on a circular path around the joint 26 and which starting from a certain swivel position adjoins the crank path and runs on it determines the respective swivel position of the rod 22 with respect to the front roof section 3 depending upon its position. As shown in FIGS. 11 and 12, in the end swivel position, the front roof section 3 is deposited in the stowage space 6 and the cover 7 is again folded back into its cover position by the drive device 46 pivoting the rod 8. Thus, the vehicle roof 1 of the convertible 2 is placed in its open position. The vehicle roof 1 is closed in the opposite sequence of motions.

While the present invention has been illustrated and described in connection with what is considered the most practical and preferred embodiments, it is understood that this invention is not limited to the embodiments disclosed herein but is intended to cover various arrangements included within the spirit and scope of the broadest interpretations and equivalent arrangements.

We claim:
1. A convertible roof for a motor vehicle, said convertible roof comprising:
   a front roof section;
   a rear roof section; and
   a first lever means for pivotally-mounting said front roof section to said motor vehicle, said rear roof section being pivotally-mounted on at least one of said front roof section and said first lever means;
   wherein said rear roof section in operation is pivoted upwardly into a position over said front roof section and is lowered jointly with said front roof section into a rear stowage space of said motor vehicle.
2. The motor vehicle roof as claimed in claim 1, wherein said first lever means includes a first lever and a second lever which combine to form a four-bar mechanism.
3. The motor vehicle roof as claimed in claim 1, wherein said rear roof section is supported by a second lever means.
4. The motor vehicle roof as claimed in claim 3, wherein said second lever means includes a first rod member and a second rod member which combine to form a four-bar mechanism for supporting said rear roof section.
5. The motor vehicle roof as claimed in claim 4, wherein said second rod member is coupled to said front roof section and said first rod member is coupled to said second lever.
6. The motor vehicle roof as claimed in claim 1, wherein said first lever means is located substantially in an area proximate to a side front edge of said rear roof section when said motor vehicle roof is placed in a closed position.
7. The motor vehicle roof as claimed in claim 3, wherein said second lever means includes a first rod member supported on said front roof section and a second rod member which is coupled to said second lever via a supporting rod member.
8. The motor vehicle roof as claimed in claim 7, further including a drive means for changing a distance between said first rod member and said second lever, said drive means interconnecting said first rod member and said second lever for supporting said front roof section.
9. The motor vehicle roof as claimed in claim 8, wherein said second lever for supporting said front roof section and said second rod member for supporting said rear roof section are supported on said front roof section.
10. The motor vehicle roof as claimed in claim 9, further comprising a positioning means for positioning said rear roof element on said front roof section.
11. The motor vehicle roof as claimed in claim 10, wherein said positioning means includes a crank mechanism mounted on said second lever and an actuating mechanism connected to said second rod member for engaging said crank mechanism to change an angular position of said second lever relative to said front roof section.
12. The motor vehicle roof as claimed in claim 11, wherein when said motor vehicle roof is lowered, said rear roof section is pivoted over said front roof section, and said front roof section and said rear roof section are jointly deposited into the stowage space.
13. The motor vehicle roof as claimed in claim 1, wherein said front roof section and said rear roof section are individually actuated using separate drive mechanisms.
14. The motor vehicle roof as claimed in claim 1, wherein said front roof section and said rear roof section are individually actuated using a common drive mechanism.

* * * * *